(12) United States Patent
Ueno

(10) Patent No.: US 12,271,569 B2
(45) Date of Patent: Apr. 8, 2025

(54) ELECTRONIC DEVICE, IMAGE FORMING APPARATUS, AND METHOD FOR CONTROLLING ELECTRONIC DEVICE

(71) Applicant: SEIKO EPSON CORPORATION, Tokyo (JP)

(72) Inventor: Kikuo Ueno, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/466,849

(22) Filed: Sep. 14, 2023

(65) Prior Publication Data

US 2024/0086027 A1 Mar. 14, 2024

(30) Foreign Application Priority Data

Sep. 14, 2022 (JP) ................................ 2022-145882

(51) Int. Cl.
*G06F 3/0481* (2022.01)
*G06F 8/65* (2018.01)
*G06F 8/71* (2018.01)

(52) U.S. Cl.
CPC .............. *G06F 3/0481* (2013.01); *G06F 8/65* (2013.01); *G06F 8/71* (2013.01)

(58) Field of Classification Search
CPC ............. G06F 3/0481; G06F 8/65; G06F 8/71
See application file for complete search history.

(56) References Cited

U.S. PATENT DOCUMENTS

| | | | |
|---|---|---|---|
| 10,664,772 B1 * | 5/2020 | Poel | G06F 3/04817 |
| 2018/0341434 A1 * | 11/2018 | Han | G06F 3/1221 |
| 2021/0195049 A1 | 6/2021 | Ikawa et al. | |
| 2023/0283851 A1 * | 9/2023 | Stathacopoulos | H04N 21/6587 |
| | | | 725/61 |

FOREIGN PATENT DOCUMENTS

| | | |
|---|---|---|
| JP | 2016143305 A | 8/2016 |
| JP | 2021099741 A | 7/2021 |

* cited by examiner

*Primary Examiner* — Robert J Michaud
(74) *Attorney, Agent, or Firm* — CHIP LAW GROUP

(57) ABSTRACT

An electronic device includes a touch panel, an operation section that receives an operation, an NW communicator that communicates with a server device, a storage storing firmware, and a controller. After update information providing a notification of an update to the firmware has been received from the server device, the controller causes an update guidance icon providing a notification of a firmware update to be displayed on a home screen when the home screen is displayed on the touch panel. The home screen is displayed if the time period during which no operation is received by the operation section is greater than a predetermined time period.

9 Claims, 6 Drawing Sheets

185

| USER ID | PASSWORD | ENABLED FUNCTION | ADMINISTRATOR |
|---------|----------|------------------|---------------|
| AAAAA | BBBBB | COPY, FAX, PRINT | ○ |
| CCCCC | DDDDD | IMAGE READING | — |
| ... | ... | ... | ... |

ELECTRONIC DEVICE, IMAGE FORMING APPARATUS, AND METHOD FOR CONTROLLING ELECTRONIC DEVICE

The present application is based on, and claims priority from JP Application Serial Number 2022-145882, filed Sep. 14, 2022, the disclosure of which is hereby incorporated by reference herein in its entirety.

BACKGROUND

1. Technical Field

The present disclosure relates to an electronic device, an image forming apparatus, and a method for controlling an electronic device.

2. Related Art

A device that notifies the user of an update to firmware is known.

For example, a display device disclosed in JP-A-2016-143305 causes a display to display an update notification image, which provides a notification of an update to software, based on update notification image data if the timing at which the update notification image was generated was during the normal mode. In addition, if the timing at which the update notification image was generated was during the power-saving mode, the display device does not cause the display to display an update notification image even when the update notification image is prepared.

Unfortunately, when an update to the firmware is caused to be displayed while a user is using an electronic device, the user operation may be hindered.

SUMMARY

The present disclosure is an electronic device including a display, an operation section configured to receive an operation, a communicator configured to communicate with a server device, a storage storing firmware, and a controller. The controller is configured to, after receipt of update information providing a notification of an update to the firmware from the server device, cause first update guidance providing a notification of the update to the firmware to be displayed on a first screen when the first screen is displayed on the display. The first screen is displayed if a time period during which no operation is received by the operation section is greater than a predetermined time period.

The present disclosure is an image forming apparatus including a display, an operation section configured to receive an operation, a communicator configured to communicate with a server device, a storage storing firmware, and a controller. The controller is configured to, after receipt of update information providing a notification of an update to the firmware from the server device, cause first update guidance providing a notification of the update to the firmware to be displayed on a first screen when the first screen is displayed on the display. The first screen is displayed if a time period during which no operation is received by the operation section is greater than a predetermined time period.

The present disclosure is a method for controlling an electronic device including a display, an operation section for receiving an operation, and a storage storing firmware. The method includes communicating with a server device, and causing, after receipt of update information providing a notification of an update to the firmware from the server device, first update guidance providing a notification of the update to the firmware to be displayed on a first screen when the first screen is displayed on the display. The first screen is displayed if a time period during which no operation is received by the operation section is greater than a predetermined time period.

DESCRIPTION OF EMBODIMENTS

1. System Configuration

Figure 1:
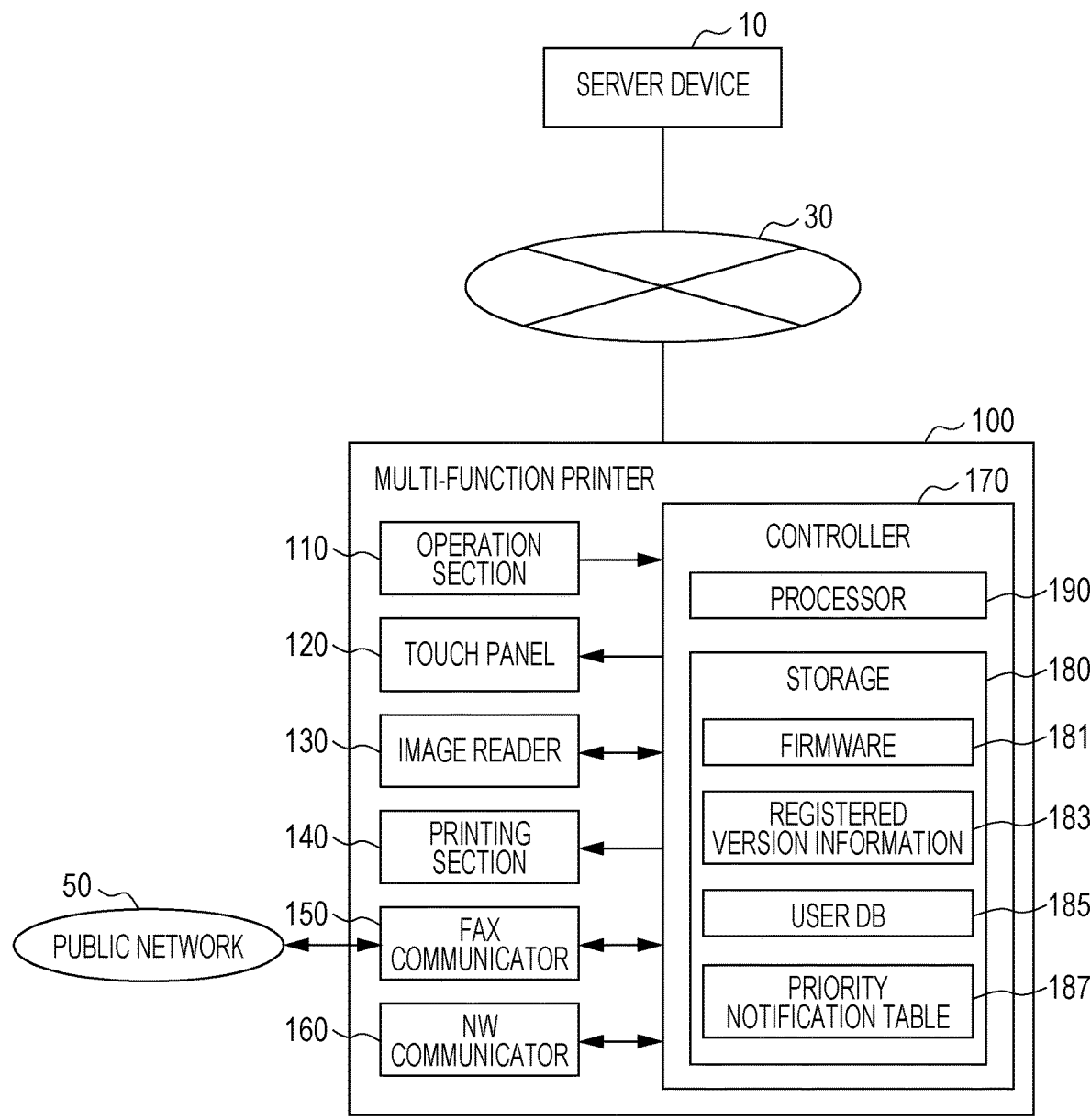
FIG. 1 is a diagram illustrating a system configuration.

FIG. 1 is a diagram illustrating a system configuration according to the present embodiment.

A system 1 according to the present embodiment includes a server device 10 and a multi-function printer 100 that are connected via a network 30. Although FIG. 1 illustrates a configuration in which the multi-function printer 100 is coupled in a wired manner to the network 30, the multi-function printer 100 may be wirelessly connected to the network 30. The multi-function printer 100 corresponds to an electronic device and an image forming apparatus.

The server device 10 stores firmware of the multi-function printer 100 and downloads the firmware to the multi-function printer 100 in response to a request from the multi-function printer 100.

2. Configuration of Multi-Function Printer

The configuration of the multi-function printer 100 will now be described.

The multi-function printer 100 includes an operation section 110, a touch panel 120, an image reader 130, a printing section 140, a facsimile communicator 150, a network communicator 160, and a controller 170. Hereafter, the facsimile communicator 150 will be referred to as a FAX communicator 150 and the network communicator 160 will be referred to as an NW communicator 160.

The operation section 110 includes physical keys such as numeric keys, a decision key, and a start key. The physical keys are not illustrated in the figure. The operation section 110 outputs an operation signal corresponding to a physical key with which an operation has been received, to the second controller 170.

The touch panel 120 corresponds to a display and an operation section and includes a display panel of a liquid crystal display or organic electroluminescence (EL) and a touch sensor. The display panel and the touch sensor are not illustrated in the figure. The touch sensor detects a touch operation of the user. A touch operation is an operation in which the user causes a finger of the user or an indicator to touch the touch panel 120. The touch sensor outputs coordinate information indicating the location of a detected touch operation to the controller 170. The coordinate information is information indicating the coordinates in the coordinate system set in advance on the touch panel 120.

The image reader 130 includes a light source, an image sensor, an actuator, a driving circuit for driving the actuator, a sensor, and so on. The light source, the image sensor, the actuator, the driving circuit for driving the actuator, and the sensor are not illustrated in the figure. The image reader 130 reads an image of a document placed on a platen and converts the read image of the document into image data. The image reader 130 outputs the image data obtained by conversion to the controller 170.

The printing section 140 includes an ink cartridge that contains ink and a head that ejects ink supplied from the ink cartridge onto a sheet. The ink cartridge and the head are not illustrated in the figure. The printing section 140 prints an image on a sheet by an ink jet method under control of the controller 170. The printing section 140 is not limited to being configured to perform printing by an ink jet method and may be configured to perform printing by an electrophotographic printing method.

The FAX communicator 150 is a communication interface including a facsimile communication module that performs fax communication via a public network, and transmits and receives image data to and from another facsimile machine or the like via the public network.

The NW communicator 160 includes, for example, a network adapter such as a network interface card (NIC) and performs data communication via the network 30 with the server device 10. The NW communicator 160 corresponds to a communicator.

The controller 170 is a computer device including a storage 180 and a processor 190.

The storage 180 includes a random-access memory (RAM) and a read-only memory (ROM). The RAM is used as an operation area of the first processor 190. The ROM stores firmware 181, registered version information 183, a user database 185, a priority notification table 187, various types of setting information installed in the multi-function printer 100, and so on. The registered version information 183 is information indicating the version of the firmware 181 that has been installed in the multi-function printer 100. Hereafter, a database will be referred to as a DB.

Figures 2, 3:
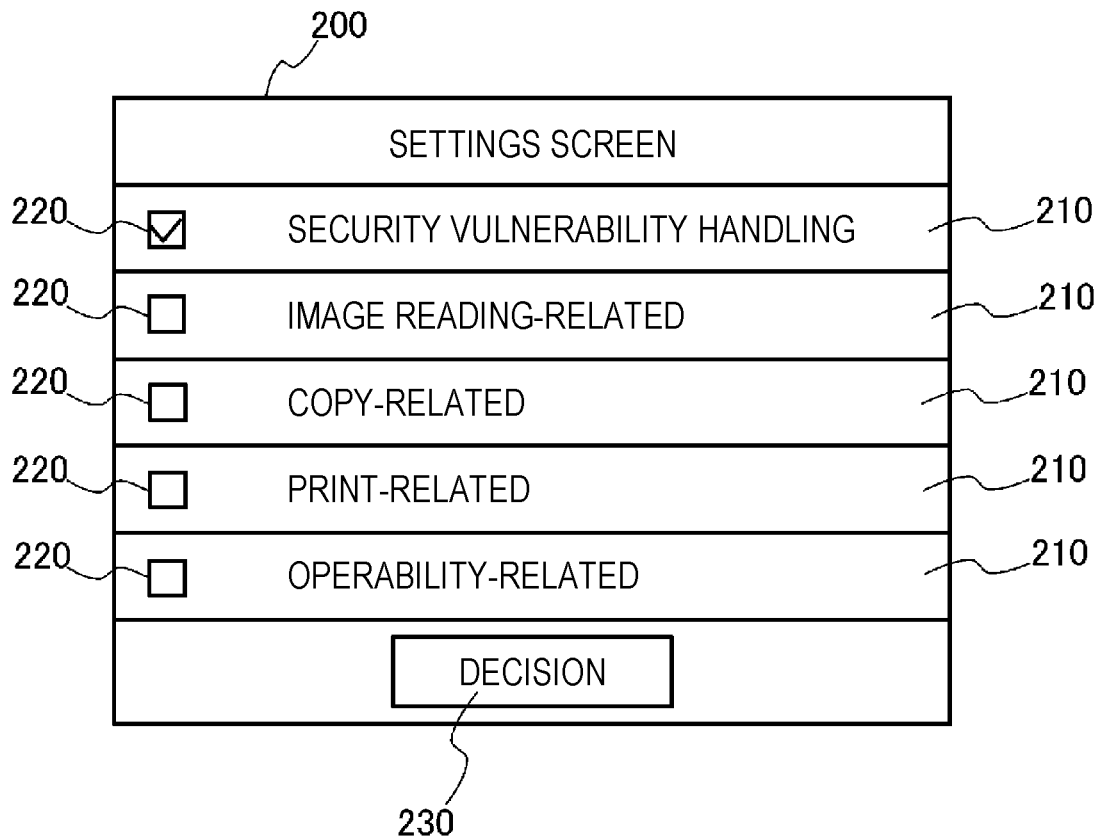
FIG. 2 is a table illustrating a configuration of a user database.
FIG. 3 is a diagram illustrating an example of a registration screen.

FIG. 2 is a table illustrating an example of a configuration of the user DB 185.

With reference to FIG. 2, the configuration of the user DB 185 will be described.

The user DB 185 is a database in which information of users who use the multi-function printer 100 is registered. A single record in the user DB 185 contains a user identifier (ID), a password, an enabled function, and administrator information. The user ID and the password are authentication information for verifying the user. The enabled function is information indicating, among the functions of the multi-function printer 100, a function that the user is permitted to use. The administrator information is information indicating whether the user identified by the user ID and the password is an administrator.

The priority notification table 187 is a table in which functions are registered. For each of the functions, a notification of a firmware update is permitted to be displayed as a pop-up. The functions described here are functions of the multi-function printer 100 that are controlled by firmware downloaded from the server device 10. The functions of the multi-function printer 100 registered in the priority notification table 187 include security vulnerability handling, image reading-related functions, copy-related functions, print-related functions, operability-related functions, and so on. The functions registered in the priority notification table 187 are referred to as priority notification functions. In response to receiving, from the server device 10, update information of firmware that controls the functions registered in the priority notification table 187, the controller 170 issues a notification of a firmware update as a pop-up display. More particularly, even when the multi-function printer 100 is executing a process or is receiving an operation of the user with the operation section 110 or the touch panel 120, the controller 170 issues a notification of the firmware update as a pop-up display.

FIG. 3 is a diagram indicating a notification settings screen 200, which is displayed on the touch panel 120, for setting functions to be registered in the priority notification table 187.

The notification settings screen 200 displays each function 210 capable of being registered as a priority notification function in the priority notification table 187, checkboxes 220 displayed in association with the respective functions, and a decision button 230.

Through a touch operation, the user checks the checkbox 220 associated with a function that the user wants to register as a priority notification function in the priority notification table 187. Thereby, the function for which the checkbox 220 has been checked is registered as a priority notification function in the priority notification table 187.

The processor 190 is constituted by a central processing unit (CPU) or a microprocessor unit (MPU). The processor 190 may be a single processor or may be comprised of multiple processors. In addition, the processor 190 may be configured as a system on a chip (SoC) in which the processor 190 is integrated with part or whole of the storage 180 and other circuits. In addition, the processor 190 may be configured as a combination of a CPU, which executes a program, and a digital signal processor (DSP), which executes predetermined arithmetic processing.

The controller 170 accesses the server device 10 every set time period, which has been set in advance. When the set time period, which has been set in advance, is measured by an update check timer, the controller 170 accesses the server device 10. The update check timer is a timer that measures a time interval for asking the server device 10 whether a firmware update is present. The controller 170 accesses the server device 10 and askes the server device 10 whether a firmware update is present. The set time period may be set by the user such that the server device 10 is accessed, for example, at periodic intervals, such as every five minutes. The set time period may be set by the user at the start-up of the electronic device or may be set on a home screen 300 described later.

If an update to the firmware is present, the controller 170 receives update information from the server device 10. The update information includes version information of the updated firmware and function information indicating the functions of the multi-function printer 100 that are to be controlled by the updated firmware.

Upon receiving update information from the server device 10, the controller 170 compares the version information included in the received update information with the version information of firmware that has been installed in the multi-function printer 100. Hereafter, the version information included in the received update information will be referred to as received version information.

If the received version information is the same as the registered version information 183 or if the received version information is earlier than the registered version information 183, the controller 170 neither displays firmware update guidance on the display panel 125 nor updates the firmware.

In addition, if the received version information is later than the registered version information 183, the controller 170 causes an update guidance icon 310, which is first update guidance, to be displayed on the home screen 300.

Figure 4:
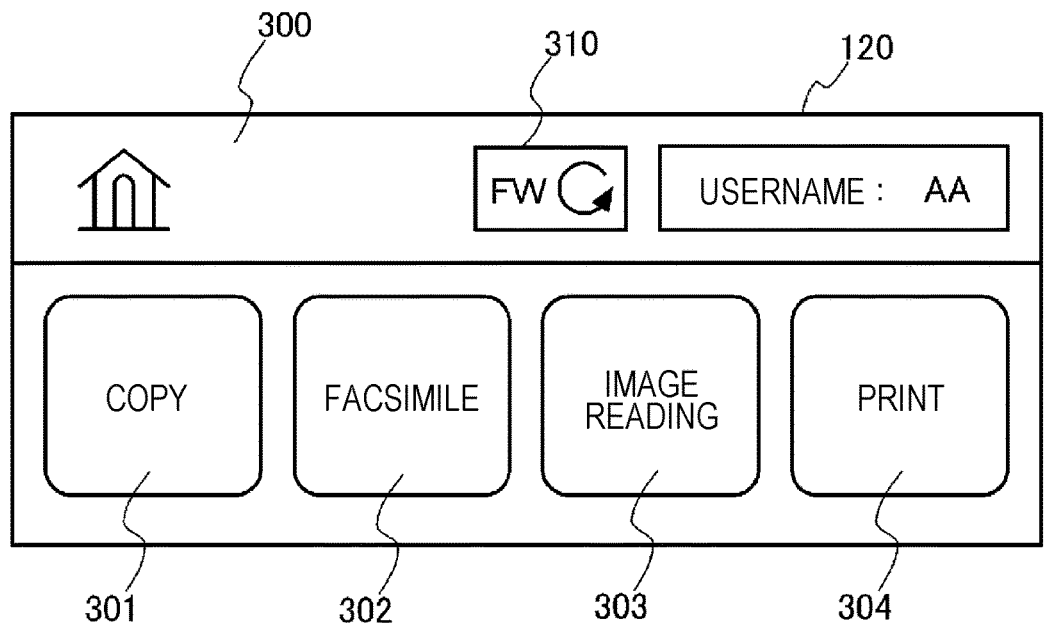
FIG. 4 illustrates an example of a home screen.

FIG. 4 illustrates an example of the home screen 300. The home screen 300 corresponds to a first screen.

On the home screen 300, select buttons 301, 302, 303, and 304 for respectively selecting the functions of copying, facsimile, image reading, and printing included in the multi-function printer 100, and the update guidance icon 310 are displayed.

The home screen 300 is a screen that is displayed first when the user uses the multi-function printer 100. In addition, the home screen 300 is a screen on which the user selects a function of the multi-function printer 100 to use and is a standby screen that is displayed on the display panel 125 if the time period during which no operation of the user is detected is greater than a predetermined time period.

When update information is received from the server device 10 and the received version information included in the received update information is later than the registered version information 183, the update guidance icon 310 is displayed on the home screen 300. In addition, the update guidance icon 310 is displayed on the home screen 300 until firmware corresponding to the update information received from the server device 10 is installed in the multi-function printer 100. In other words, when the latest firmware is installed in the multi-function printer 100, the update guidance icon 310 is erased from the home screen 300.

The home screen 300 is displayed on the touch panel 120, for example, in the following cases.

In the first case, the time period during which no operation is received by the operation section 110 or the touch panel 120 is greater than the predetermined time period. if the time period during which no operation is received is greater than the predetermined time period, the controller 170 changes an operation screen 320 displayed on the touch panel 120 to the home screen 300.

In the next case, the return button 327 displayed on the operation screen 320 is pressed. When the return button 327 is pressed, the controller 170 changes the operation screen 320 displayed on the touch panel 120 to the home screen 300.

In the next case, execution of the function of copying, facsimile, image reading, printing, or the like is complete. When execution of the function of copying, facsimile, image reading, printing, or the like is complete, the controller 170 changes the operation screen 320 displayed on the touch panel 120 to the home screen 300.

Figure 5:
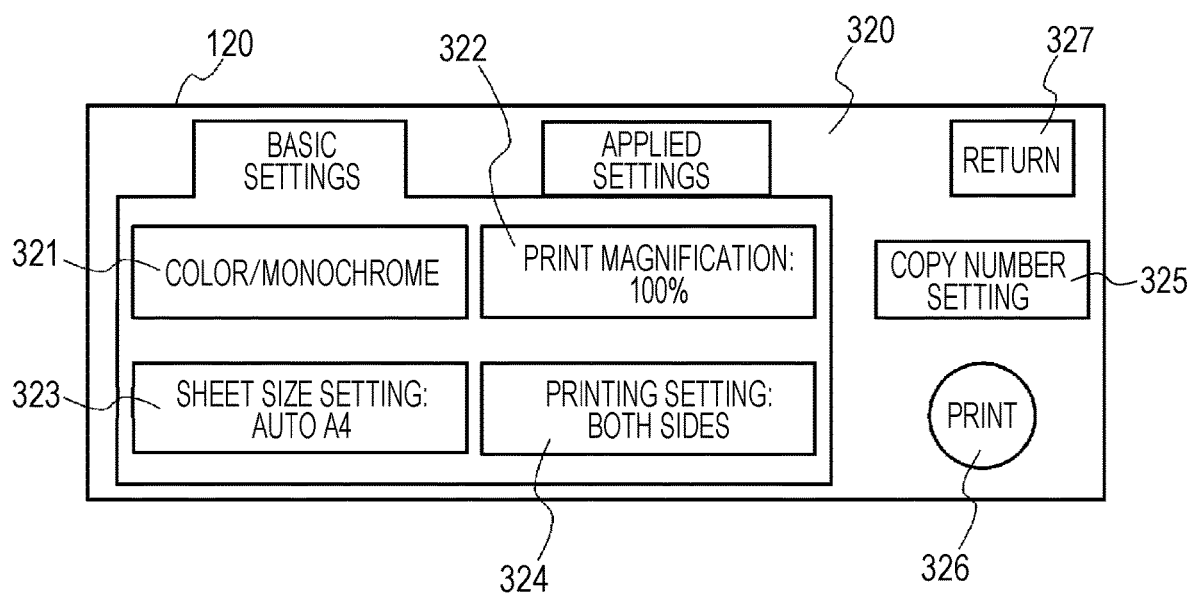
FIG. 5 illustrates an example of an operation screen for printing.

FIG. 5 illustrates an example of the operation screen 320.

Regarding the operation screen 320, when any one of the select buttons 301, 302, 303, and 304 displayed on the home screen 300 is selected, the operation screen 320 for a function corresponding to the selected one of the select buttons 301, 302, 303, and 304 is displayed. FIG. 5 illustrates the operation screen 320 for printing. Although not illustrated in the figure, the operation screens 320 are provided respectively for the functions of copying, facsimile, image reading, and printing.

On the operation screen 320, a color or monochrome setting button 321, a print magnification setting button 322, a sheet size setting button 323, a single-sided or double-sided printing setting button 324, and so on are displayed. In addition, on the operation screen 320, a copy number setting button 325, a print button 326, a return button 327, and so on are displayed.

Figure 6:
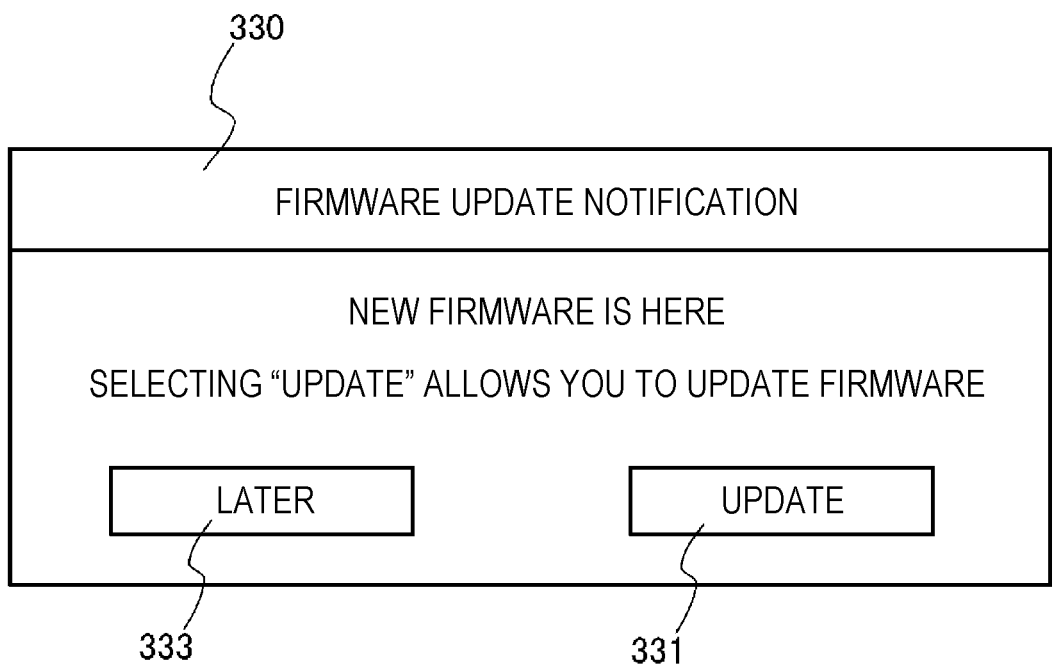
FIG. 6 illustrates an example of a notification screen.

FIG. 6 illustrates an example of a notification screen 330. The notification screen 330 corresponds to a second screen.

When the received version information is later than the registered version information 183 and any one of a first condition, a second condition, and a third condition mentioned below is satisfied, the controller 170 causes the notification screen 330 to be displayed as a pop-up. The first condition, the second condition, and the third condition correspond to a condition set in advance. The notification screen 330 is a screen notifying the user of the presence of a firmware update and is a screen displayed as a pop-up.

The first condition is that a user registered as an administrator is logged in.

The second condition is that, when an administrator has not been set, the function information included in the update information matches the priority notification function registered in the priority notification table 187.

The third condition is that, when an administrator has not been set, the function information included in the update information is not the priority notification function registered in the priority notification table 187, and the home screen 300 is displayed on the touch panel 120.

The first condition will be described in detail below.

The first condition requires that a logged-in user be the user who has been registered as an administrator. The user registered as an administrator is a person in charge of performing an operation of updating firmware installed in the multi-function printer 100 and therefore causes the notification screen 330 to be displayed as a pop-up. The controller 170 causes the notification screen 330, which is second update guidance, to be displayed as a pop-up on the touch panel 120. On the notification screen 330, as illustrated in FIG. 6, guidance is displayed. The guidance notes, for example, that a new firmware update is present and that pressing an update button 331 will start updating the firmware. On the notification screen 330, the update button 331 and a button 333 are also displayed. Pressing the update button 331 starts the update, and pressing the button 333 postpones the update. Both buttons are labelled accordingly to denote their respective functions.

The second condition will now be described.

The second condition applies when no administrator is not registered in the user DB 185 or when a user other than an administrator is logged in. In particular, the second condition requires that the function information included in the update information match the priority notification function registered in the priority notification table 187. For example, it is assumed that security vulnerability handling is registered as a priority notification function in the priority notification table 187 and that the function information received from the server device 10 includes information indicating firmware that reduces the vulnerability in security of the multi-function printer 100. In this case, the controller 170 causes the touch panel 120 to display the notification screen 330, which is the second update guidance, as a pop-up.

The third condition also applies when no administrator is registered in the user DB 185 or when a user other than an administrator is logged in.

The third condition requires that the function information included in the update information be not included in the priority notification function registered in the priority notification table 187, and the home screen 300, which is a standby screen, be displayed on the touch panel 120.

When the home screen 300 is displayed on the touch panel 120, the user is not operating the operation section 110 or the touch panel 120, which does not hinder a user operation. Therefore, the controller 170 causes the touch panel 120 to display the notification screen 330, which is the second update guidance, as a pop-up.

Although not limited to the case under the third condition, while a user who is logged in is operating the touch panel 120, displaying the notification screen 330, as a pop-up, results in hindering the operation in some cases. Therefore, the notification screen 330 may be displayed as a pop-up immediately after the return from the operation screen 320 to the home screen 300.

In addition, if the third condition is not satisfied, the controller 170 may cause the firmware update to be stored in the storage 180, and, after the lapse of a predetermined time period, may determine again whether the third condition is satisfied. If it is determined that the third condition is satisfied, the controller 170 causes the touch panel 120 to display the notification screen 330 as a pop-up.

A description will now be given of the case where the button 333 displayed on the notification screen 330 is pressed.

When the button 333 indicating that the update is to be postponed is pressed, the controller 170 causes the version information of firmware, for which an update notification has been provided using the notification screen 330, to be stored in the storage 180. This version information is referred to as notification-completed version information. In addition, the controller 170 turns on a flag indicating that the notification of a firmware update has been displayed as a pop-up. The flag is referred to as a notification-completed flag.

Then, the controller 170 waits until the lapse of the set time period that has been set in advance. Upon the lapse of the set time period, the controller 170 again accesses the server device 10 and asks the server device 10 whether a firmware update is present. The controller 170 again receives update information from the server device 10.

The controller 170 compares the received version information included in the update information with the registered version information and the notification-completed version information. If the received version information is later than the registered version information and is the same as the notification-completed version information, and the notification-completed flag is turned on, the controller 170 does not perform a pop-up display of the notification screen 330. In addition, if the received version information is later than the registered version information and the notification-completed version information, the controller 170 causes the touch panel 120 to display the notification screen 330 as a pop-up.

3. Operation of Multi-Function Printer

Figure 7:
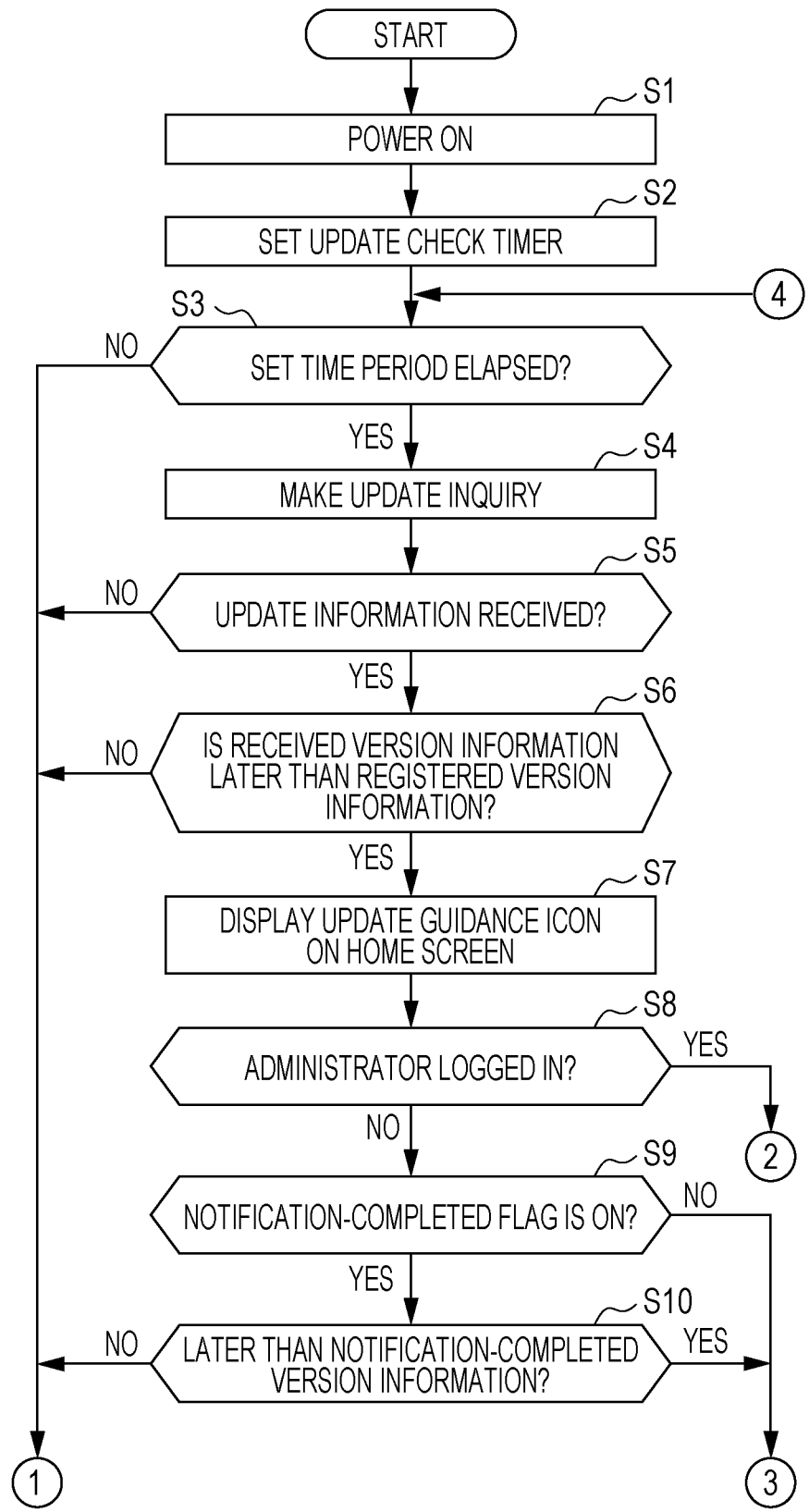
FIG. 7 is a flowchart illustrating operation of a multi-function printer.
Figure 8:
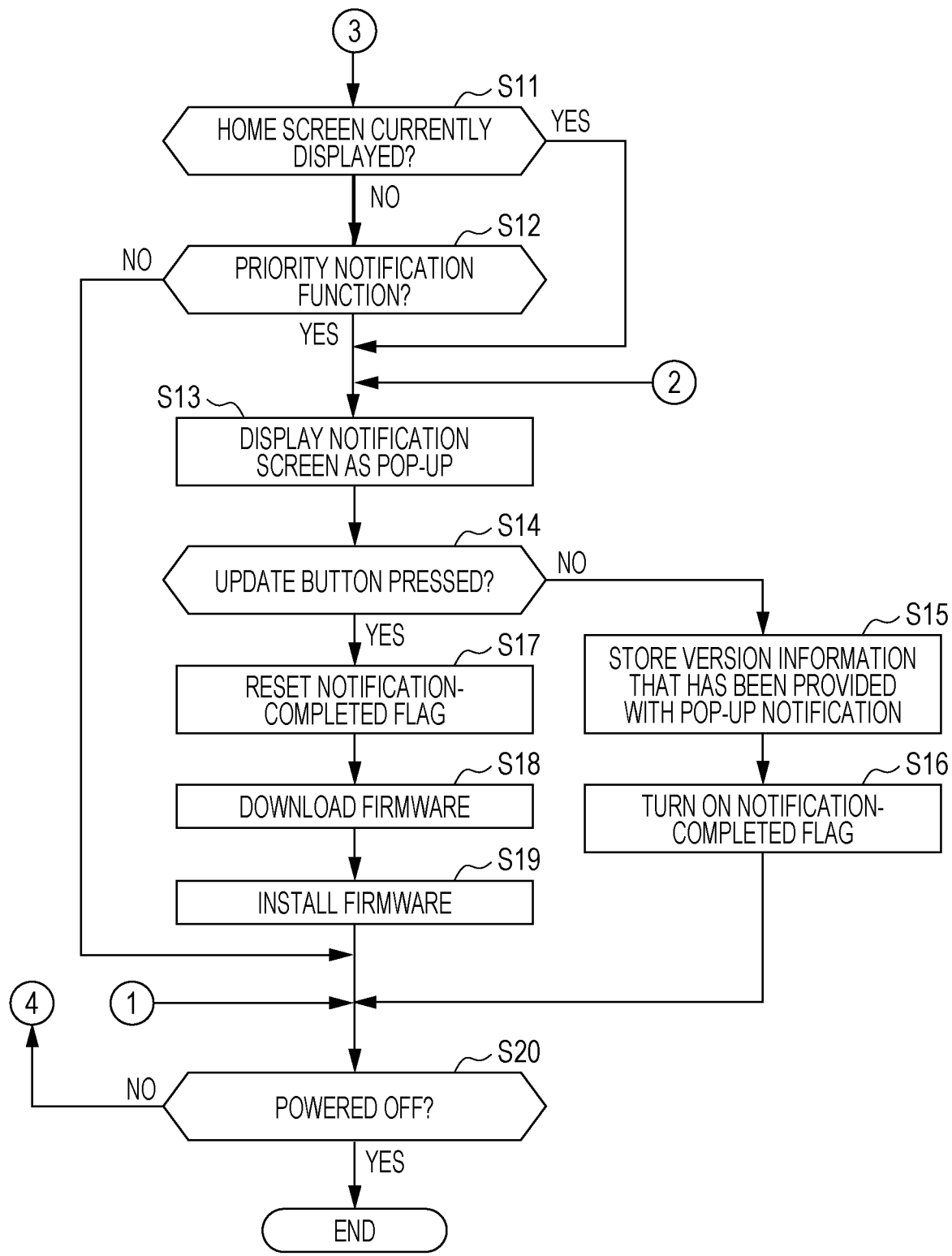
FIG. 8 is a flowchart illustrating continued operation of the multi-function printer.

FIGS. 7 and 8 are flowcharts illustrating operation of the controller 170.

With reference to the flowcharts in FIGS. 7 and 8, the operation of the controller 170 will be described.

When the multi-function printer 100 is powered on and starts (step S1), the controller 170 sets the update check timer (step S2). The update check timer starts measuring a time interval. Then, by using the time interval measured by the update check timer, the controller 170 determines whether the set time period has elapsed (step S3).

If the set time period has not elapsed (No in step S3), the controller 170 proceeds to step S20, where the controller 170 determines whether the multi-function printer 100 is powered off (step S20). If the multi-function printer 100 is powered off (Yes in step S20), the controller 170 terminates the process flow. In contrast, if the multi-function printer 100 is not powered off (No in step S20), the controller 170 returns to the determination in step S3.

The set time period has elapsed (Yes in step S3), the controller 170 makes an update inquiry to the server device 10 (step S4). The update inquiry asks whether a firmware update is present.

If the firmware update is absent, the server device 10 notifies the multi-function printer 100 of the absence of a firmware update. In contrast, if the firmware update is present, the server device 10 transmits firmware update information to the multi-function printer 100.

If the controller 170 does not receive firmware update information from the server device 10 (No in step S5) and receives a notification of the absence of a firmware update, the controller 170 proceeds to the determination in step S20, where the controller 170 determines whether the multi-function printer 100 is powered off (step S20). The subsequent operations of the controller 170 have already been described and therefore are omitted.

If the controller 170 receives the firmware update information from the server device 10 (Yes in step S5), the controller 170 determines whether the received version information included in the update information is later than the registered version information 183 (step S6).

If the received version information is not later than the registered version information 183 (No in step S6), that is, if the received version information is the same as the registered version information 183, the controller 170 proceeds to the determination in step S20. The subsequent operations of the controller 170 have already been described and therefore are omitted.

In contrast, if the received version information is later than the registered version information 183 (Yes in step S6), the controller 170 sets the update guidance icon 310 to be displayed while the home screen 300 is displayed (step S7). That is, when the controller 170 causes the touch panel 120 to display the home screen 300, the home screen 300 on which the update guidance icon 310 is displayed is displayed.

Then, the controller 170 determines whether the user registered as an administrator is logged in (step S8). If the user registered as an administrator is logged in (Yes in step S8), the controller 170 proceeds to step S13, where the controller 170 causes the notification screen 330 to be displayed as a pop-up (step S13).

In contrast, if a user other than the user registered as an administrator is logged in or administrator registration has not been performed (No in step S8), the controller 170 determines whether the notification-completed flag displayed as a pop-up is turned on (step S9). If the notification-completed flag displayed as a pop-up is turned on (Yes in step S9), the controller 170 determines whether the received version information is later than the notification-completed version information (step S10).

If the received version information is the same as the notification-completed version information (No in step S10), the controller 170 proceeds to the determination in step S20. The subsequent operations of the controller 170 have already been described and therefore are omitted.

In contrast, if the received version information is later than the notification-completed version information (Yes in step S10), the controller 170 determines whether the screen currently displayed on the touch panel 120 is the home screen 300 (step S11). In addition, if the notification-completed flag displayed as a pop-up is not turned on (No in step S9), the controller 170 determines whether the screen currently displayed on the touch panel 120 is the home screen 300 (step S11).

If the screen currently displayed on the touch panel 120 is the home screen 300 (Yes in step S11), the controller 170 causes the notification screen 330 to be displayed as a pop-up (step S13).

In contrast, if the screen currently displayed on the touch panel 120 is a screen other than the home screen 300 (No in step S11), the controller 170 determines whether the function information included in the update information matches the priority notification function (step S12). If the function information included in the update information is not firmware for updating a function of the multi-function printer 100 set as the priority notification function (No in step S12), the controller 170 proceeds to the determination in step S20. The subsequent operations of the controller 170 have already been described and therefore are omitted.

In contrast, if the function information included in the update information is firmware for updating a function of the multi-function printer 100 set as the priority notification function (Yes in step S12), the controller 170 causes the notification screen 330 to be displayed as a pop-up (step S13).

Then, the second controller 170 determines whether the update button 331 displayed on the notification screen 330 is pressed (step S14). If the update button 331 is not pressed and instead the button 333 is pressed (No in step S14), the controller 170 causes the version information of firmware that has been provided with a pop-up notification to be stored in the storage 180 (step S15). Thereafter, the controller 170 turns on the pop-up notification-completed flag (step S16) and proceeds to the determination in step S20. The subsequent operations of the controller 170 have already been described and therefore are omitted.

In addition, if the update button 331 is pressed (Yes in step S14), the controller 170 resets the notification-completed flag (step S17). Thereafter, the controller 170 accesses the server device 10 and downloads firmware from the server device 10 (step S18). Then, the controller 170 installs the downloaded firmware in the multi-function printer 100 (step S19) and proceeds to the determination in step S20. The subsequent operations of the controller 170 have already been described and therefore are omitted.

4. Overview of Present Disclosure

The following appendices provide an overview of the present disclosure.

Appendix 1: An electronic device comprising:
a display;
an operation section configured to receive an operation;
a communicator configured to communicate with a server device;
a storage storing firmware; and
a controller configured to, after receipt of update information providing a notification of an update to the firmware from the server device, cause first update guidance providing a notification of the update to the firmware to be displayed on a first screen when the first screen is displayed on the display, the first screen being displayed if a time period during which no operation is received by the operation section is greater than a predetermined time period.

According to this configuration, when update information of firmware is received from the server device, and the first screen is displayed on the display, the first update guidance providing a notification of a firmware update is displayed on the first screen. Accordingly, the first update guidance providing a notification of a firmware update may be displayed so as to avoid hindering a user operation.

Appendix 2: The electronic device according to appendix 1, wherein the controller is configured to, when a condition set in advance is satisfied, cause the display to display, as a pop-up, a second screen different from the first screen, the second screen including second update guidance different from the first update guidance.

According to this configuration, when the condition set in advance is satisfied, the second screen including the second update guidance different from the first update guidance to be displayed as a pop-up on the display.

Accordingly, setting a condition enables the second screen including the second update guidance to be displayed as a pop-up when the condition is satisfied.

Appendix 3: The electronic device according to appendix 2, wherein the controller is configured to, when a screen displayed on the display is the first screen, determine that the condition is satisfied, and to cause the display to display, as a pop-up, the second screen including the second update guidance.

According to this configuration, when a screen displayed on the display is the first screen, the second screen including the second update guidance is displayed as a pop-up on the display.

Accordingly, the second update guidance providing a notification of a firmware update may be displayed as a pop-up so as to avoid hindering a user operation.

Appendix 4: The electronic device according to appendix 2 or 3, wherein
the storage stores identification information of an administrator permitted to update the firmware, and
the controller is configured to, when the administrator is logged in, determine that the condition set in advance is satisfied, and to cause the display to display, as a pop-up, the second screen including the second update guidance.

According to this configuration, when the administrator permitted to update the firmware is logged in, the second screen including the second update guidance is displayed as a pop-up on the display.

Accordingly, when the administrator capable of updating firmware is logged in, the second screen including the second update guidance may be displayed as a pop-up, which may reduce the hindrance to an operation of another user.

Appendix 5: The electronic device according to any one of appendices 2 to 4, wherein
the update information includes function information indicating a function of the electronic device to be updated by firmware,
the storage stores a function of the electronic device set for a priority notification, and
the controller is configured to, when the function indicated by the function information included in the update information corresponds to the function of the electronic device set for the priority notification, determine that the condition set in advance is satisfied, and to cause the display to display, as a pop-up, the second screen including the second update guidance.

According to this configuration, when the type indicated by the type information included in the update information is a type set in the priority notification, the second screen including the second update guidance is displayed as a pop-up.

Accordingly, when the firmware is firmware to which an immediate update is desirable, the second screen including the second update guidance may be displayed as a pop-up.

Appendix 6: The electronic device according to any one of appendices 2 to 5, wherein the controller is configured to:
cause version information of the firmware included in the update information to be stored in the storage, and
when the update information including version information later than the version information stored in the storage is newly received from the server device, cause the display to display, as a pop-up, the second screen including the second update guidance.

According to this configuration, regarding firmware for which the second screen including the second update guidance has been displayed as a pop-up, the second screen including the second update guidance is not displayed as a pop-up until the firmware is updated to a later version than the version of this firmware. Therefore, the second screen may be inhibited from being displayed as a pop-up two or more times for the firmware of the same version.

Appendix 7: The electronic device according to appendix 5, wherein
the storage stores identification information of each registered user in association with a function of the electronic device that the each user is permitted to use, and
when the function indicated by the function information included in the update information corresponds to the function of the electronic device that a logged-in user is permitted to use, the controller causes the display to display, as a pop-up, the second screen including the second update guidance.

According to this configuration, when the updated firmware is firmware for controlling the function of the multi-function printer that a logged-in user is permitted to use, the second update guidance is displayed as a pop-up. Therefore, a firmware update may be inhibited from being displayed as a pop-up when a user who is not permitted to use the function is logged in.

Appendix 8: An image forming apparatus comprising:
a display;
an operation section configured to receive an operation;
a communicator configured to communicate with a server device;
a storage storing firmware; and
a controller configured to, after receipt of update information providing a notification of an update to the firmware from the server device, cause first update guidance providing a notification of the update to the firmware to be displayed on a first screen when the first screen is displayed on the display, the first screen being displayed if a time period during which no operation is received by the operation section is greater than a predetermined time period.

According to this configuration, when update information of firmware is received from the server device, and the first screen is displayed on the display, the first update guidance providing a notification of a firmware update is displayed on the first screen. Accordingly, the first update guidance providing a notification of a firmware update may be displayed so as to avoid hindering a user operation.

Appendix 9: A method for controlling an electronic device including a display, an operation section for receiving an operation, and a storage storing firmware, the method comprising:
communicating with a server device; and
after receipt of update information providing a notification of an update to the firmware from the server device, causing first update guidance providing a notification of the update to the firmware to be displayed on a first screen when the first screen is displayed on the display, the first screen being displayed if a time period during which no operation is received by the operation section is greater than a predetermined time period.

According to this configuration, when update information of firmware is received from the server device, and the first screen is displayed on the display, the first update guidance providing a notification of a firmware update is displayed on the first screen. Accordingly, the first update guidance providing a notification of a firmware update may be displayed so as to avoid hindering a user operation.

5. Other Configurations

The embodiment described above is a desired embodiment of the present disclosure. However, the present disclosure is not limited to the embodiment described above and may be implemented in various modifications without departing from the spirit and scope of the present disclosure.

For example, although the case where the electronic device is the multi-function printer 100 has been described in the foregoing embodiment, the electronic device is not limited to the multi-function printer 100. For example, the electronic device may be any electronic device capable of performing data communication with a server device via a network, irrespective of whether the network is wired or wireless, and may be a personal computer, a portable terminal such as a tablet computer, or a smart home appliance.

In addition, the conditions under which the notification screen 330 is displayed as a pop-up may include the following fourth condition. The fourth condition is when a user who is permitted to use a function of the multi-function printer 100 to be updated by firmware is logged in and, in addition, the function information included in the update information is the function that the logged-in user is permitted to use.

When a user who is permitted to use a function of the multi-function printer 100 to be updated by firmware is logged in, the function of the multi-function printer 100 is highly likely to be used, and thus updating the firmware may enhance the convenience of the user. Therefore, the notification screen 330 is caused to be displayed as a pop-up.

In addition, the processing units of the flowchart illustrated in FIG. 7 are divided according to the main processing contents to ease understanding of the processing of the multi-function printer 100. The present disclosure will not be limited by how the processing units of the flowchart in FIG. 7 are divided and what the processing units are named. In addition, according to the processing contents, the processing of the multi-function printer 100 may be divided into more processing units or may be divided such that one processing unit includes more processing. In addition, the order of processing of the flowchart described above is not limited to the example illustrated in the figures.

In addition, when a method and a program for controlling an electronic device are implemented using a computer included in the electronic device, a program to be executed by the computer may be provided in the form of a recording medium or a transmission medium that transmits the program. As the recording medium, a magnetic or optical recording medium or a semiconductor memory device may be used. Specifically, examples of the recording medium include portable or fixed recording media such as a floppy disk, a hard disk drive (HDD), a compact disc read-only memory (CD-ROM), a digital versatile disc (DVD), a Blu-ray disc, a magneto-optical disc, a flash memory, and a card type recording medium. In addition, the recording medium mentioned above may be a nonvolatile storage device, such as a RAM, ROM, or HDD, which is an internal storage device included in a server device. Blu-ray is a registered trademark.

The update guidance icon 310 is not only displayed simply on the home screen 300 but also may change its user appeal. For example, in accordance with the function registered as a priority notification function or an elapsed time since the notification screen 330 or the update guidance icon 310 was displayed, the shape or color of the update guidance icon 310 may be changed or the update guidance icon 310 may flash on and off.

What is claimed is:

1. An electronic device comprising:
   a display;
   an operation section configured to receive an operation;
   a communicator configured to communicate with a server device;
   a storage storing firmware; and
   a controller configured to, after receipt of update information providing a notification of an update to the firmware from the server device, cause first update guidance providing a notification of the update to the firmware to be displayed on a first screen when the first screen is displayed on the display, the first screen being displayed if a time period during which no operation is received by the operation section is greater than a predetermined time period, wherein
   the first screen is a home screen that includes an update guidance icon, causing the first update guidance, and at least one of copy button, facsimile button, image scan button and print button, and
   the update guidance icon is erased from the home screen based on an installation of the firmware in the electronic device.

2. The electronic device according to claim 1, wherein the controller is configured to, when a condition set in advance is satisfied, cause the display to display, as a pop-up, a second screen different from the first screen, the second screen including second update guidance different from the first update guidance.

3. The electronic device according to claim 2, wherein the controller is configured to, when a screen displayed on the display is the first screen, determine that the condition is satisfied, and to cause the display to display, as a pop-up, the second screen including the second update guidance.

4. The electronic device according to claim 2, wherein
   the storage stores identification information of an administrator permitted to update the firmware, and
   the controller is configured to, when the administrator is logged in, determine that the condition set in advance is satisfied, and to cause the display to display, as a pop-up, the second screen including the second update guidance.

5. The electronic device according to claim 2, wherein
   the update information includes function information indicating a function of the electronic device to be updated by firmware,
   the storage stores a function of the electronic device set for a priority notification, and
   the controller is configured to, when the function indicated by the function information included in the update information corresponds to the function of the electronic device set for the priority notification, determine that the condition set in advance is satisfied, and to cause the display to display, as a pop-up, the second screen including the second update guidance.

6. The electronic device according to claim 2, wherein the controller is configured to:
   cause version information of the firmware included in the update information to be stored in the storage, and
   when the update information including version information later than the version information stored in the storage is newly received from the server device, cause the display to display, as a pop-up, the second screen including the second update guidance.

7. The electronic device according to claim 5, wherein
   the storage stores identification information of each registered user in association with a function of the electronic device that the each user is permitted to use, and
   when the function indicated by the function information included in the update information corresponds to the function of the electronic device that a logged-in user is permitted to use, the controller causes the display to display, as a pop-up, the second screen including the second update guidance.

8. An image forming apparatus comprising:
   a display;
   an operation section configured to receive an operation;
   a communicator configured to communicate with a server device;
   a storage storing firmware; and
   a controller configured to, after receipt of update information providing a notification of an update to the firmware from the server device, cause first update guidance providing a notification of the update to the firmware to be displayed on a first screen when the first screen is displayed on the display, the first screen being displayed if a time period during which no operation is received by the operation section is greater than a predetermined time period, wherein
   the first screen is a home screen that includes an update guidance icon, causing the first update guidance, and at least one of copy button, facsimile button, image scan button and print button, and
   the update guidance icon is erased from the home screen based on an installation of the firmware in the image forming apparatus.

9. A method for controlling an electronic device including a display, an operation section for receiving an operation, and a storage storing firmware, the method comprising:
   communicating with a server device; and
   causing, after receipt of update information providing a notification of an update to the firmware from the server device, first update guidance providing a notification of the update to the firmware to be displayed on a first screen when the first screen is displayed on the display, the first screen being displayed if a time period during which no operation is received by the operation section is greater than a predetermined time period, wherein
   the first screen is a home screen that includes an update guidance icon, causing the first update guidance, and at least one of copy button, facsimile button, image scan button and print button, and
   the update guidance icon is erased from the home screen based on an installation of the firmware in the electronic device.

* * * * *